(12) United States Patent
Xiang et al.

(10) Patent No.: US 10,641,458 B2
(45) Date of Patent: May 5, 2020

(54) LIGHT EMITTING ASSEMBLY, LIGHTING APPARATUS AND VEHICLE

(71) Applicant: Foshan Ichikoh Valeo Auto Lighting Systems Co., Ltd., Foshan (CN)

(72) Inventors: Zhixin Xiang, Foshan (CN); Zebin Ni, Foshan (CN)

(73) Assignee: Foshan Ichikoh Valeo Auto Lighting Systems Co., Ltd., Foshan (CN)

(*) Notice: Subject to any disclaimer, the term of this patent is extended or adjusted under 35 U.S.C. 154(b) by 0 days.

(21) Appl. No.: 16/193,708

(22) Filed: Nov. 16, 2018

(65) Prior Publication Data
US 2019/0154228 A1    May 23, 2019

(30) Foreign Application Priority Data
Nov. 20, 2017    (CN) .......................... 2017 1 1161745

(51) Int. Cl.
| F21S 43/14 | (2018.01) |
|---|---|
| F21S 41/19 | (2018.01) |
| F21S 41/24 | (2018.01) |
| F21S 41/32 | (2018.01) |
| F21S 41/20 | (2018.01) |

(Continued)

(52) U.S. Cl.
CPC ............ F21S 43/14 (2018.01); B60Q 1/2607 (2013.01); F21S 41/141 (2018.01); F21S 41/192 (2018.01);
(Continued)

(58) Field of Classification Search
CPC ...... F21S 43/249; F21S 43/235; F21S 43/239; F21S 43/243; F21S 41/24; F21Y 2113/10; F21Y 2113/13; B60Q 2400/20
See application file for complete search history.

(56) References Cited

U.S. PATENT DOCUMENTS

| 5,711,592 A * | 1/1998 | Hotta ..................... B60Q 1/302 362/496 |
|---|---|---|
| 2005/0152141 A1* | 7/2005 | Suzuki ................. B60Q 1/0052 362/241 |

(Continued)

FOREIGN PATENT DOCUMENTS

| CN | 206419848 U | 8/2017 |
|---|---|---|
| DE | 10 2012 107 437 A1 | 6/2014 |

(Continued)

OTHER PUBLICATIONS

European Search Report dated Mar. 20, 2019 in European Patent Application No. 18206665, 3 pages.

*Primary Examiner* — Alexander K Garlen
(74) *Attorney, Agent, or Firm* — Oblon, McClelland, Maier & Neustadt, L.L.P.

(57) ABSTRACT

A light emitting assembly, a lighting apparatus and a vehicle. The light emitting assembly includes: a mounting plate; a light source assembly mounted on the mounting plate and including a first light source configured for emitting light with a first color and a second light source configured for emitting light with a second color; and a light guide member having a light entrance section and a light guide section integrally formed, the light guide member being configured to couple the light emitted from the light source assembly into the light guide member. The first light source and the second light source of the light source assembly are mounted on different mounting sub-plates of the mounting plate respectively.

12 Claims, 3 Drawing Sheets

(51) Int. Cl.
*F21S 41/141* (2018.01)
*F21S 43/249* (2018.01)
*F21S 43/20* (2018.01)
*F21S 43/31* (2018.01)
*F21S 43/40* (2018.01)
*F21S 43/19* (2018.01)
*F21S 43/239* (2018.01)
*B60Q 1/26* (2006.01)
*F21S 43/15* (2018.01)
*F21S 43/243* (2018.01)
*F21Y 113/13* (2016.01)
*F21Y 115/10* (2016.01)

(52) U.S. Cl.
CPC ............. *F21S 41/24* (2018.01); *F21S 41/285* (2018.01); *F21S 41/32* (2018.01); *F21S 43/15* (2018.01); *F21S 43/195* (2018.01); *F21S 43/239* (2018.01); *F21S 43/243* (2018.01); *F21S 43/249* (2018.01); *F21S 43/26* (2018.01); *F21S 43/31* (2018.01); *F21S 43/315* (2018.01); *F21S 43/40* (2018.01); *B60Q 2400/20* (2013.01); *F21Y 2113/13* (2016.08); *F21Y 2115/10* (2016.08)

(56) References Cited

U.S. PATENT DOCUMENTS

| | | | |
|---|---|---|---|
| 2008/0013333 A1* | 1/2008 | Koizumi | B60Q 1/2696 362/511 |
| 2012/0250343 A1* | 10/2012 | Koizumi | F21S 43/14 362/511 |
| 2014/0160779 A1* | 6/2014 | Pusch | B60Q 1/2607 362/511 |
| 2015/0036372 A1* | 2/2015 | Kohler | B60Q 1/2607 362/511 |
| 2016/0116666 A1* | 4/2016 | Sato | F21S 43/249 362/509 |
| 2016/0207450 A1* | 7/2016 | Fuentes | B60Q 1/346 |
| 2016/0252226 A1* | 9/2016 | Shih | F21S 41/24 362/511 |
| 2017/0059113 A1 | 3/2017 | Gloss et al. | |
| 2017/0276315 A1* | 9/2017 | Kawabata | G02B 6/00 |
| 2018/0238510 A1* | 8/2018 | Gloss | F21S 41/143 |

FOREIGN PATENT DOCUMENTS

DE 10 2012 112 152 A1 6/2014
WO WO 2017/068309 A1 4/2017

\* cited by examiner

LIGHT EMITTING ASSEMBLY, LIGHTING APPARATUS AND VEHICLE

TECHNICAL FIELD

The present disclosure generally relates to the lighting and/or signaling field, and particularly, to a light emitting assembly, a lighting apparatus and a vehicle.

DESCRIPTION OF THE RELATED ART

A lighting apparatus is a necessary part for various lighting and/or optically signaling devices, for providing light for lighting and/or optically signaling, and is widely applied in various fields. For example, lighting apparatuses such as vehicle lights are utilized in a motor vehicle, for ensuring safety traffic. The motor vehicle often needs various types of vehicle lights for achieving different functions, including a headlight, a fog light, a taillight, a direction indicator lamp, a stoplight, a parking light and the like. In existing motor vehicles, a single light emitting device may often achieve one function, thus the motor vehicle needs to be equipped with a plurality of light emitting devices for meeting requirements of road regulations on lighting and/or signaling functions, thereby a larger space will be occupied by the light emitting devices.

In addition, in prior arts, a light source of the light emitting device will generate a larger heat consumption, especially when a light emitting diode (LED) is used as the light source, thus it will often require to provide a separate radiator for the light emitting device, which on one hand will result in an increase in volume of the light emitting device, and on the other hand, will lead to a more complex assembling operation.

SUMMARY

An object of the present disclosure is to overcome or alleviate at least one aspect of the above mentioned and other disadvantages or problems.

The present disclosure provides a light emitting assembly for a lighting apparatus or a motor vehicle, comprising: a mounting plate comprising mounting sub-plates; a light source assembly mounted on the mounting plate, the light source assembly comprising a first light source configured for emitting light with a first color and a second light source configured for emitting light with a second color; and a light guide member having a light entrance section and a light guide section integrally formed, the light guide member being configured to couple the light emitted from the light source assembly into the light guide member; the first light source and the second light source of the light source assembly are mounted on different ones of the mounting sub-plate of the mounting plate respectively. Thereby, the mounting sub-plates for different light sources may be mounted at suitable positions in a more flexible way, and meanwhile, it will be more favorable for circuit design and heat dissipation of the light sources. Further, by arranging different types light sources (for example, emitting light having different colors) on different mounting sub-plates, multiple functions may be achieved with one light guide member, including, for example, a lighting or signaling function.

In an embodiment, the light entrance section comprises a first light receiving part and a second light receiving part, the first light receiving part being assigned to the first light source, the second light receiving part being assigned to the second light source. In this case, an orientation of the light receiving part corresponds to an orientation of the light source, such that light emitted from different light sources may be coupled into the light guide member via corresponding light receiving parts, thereby improving light coupling efficiency.

In an embodiment, the first light receiving part and the second light receiving part are arranged in sequence in a light exiting direction, thereby matching a profile of a housing in a better way.

In an embodiment, the light receiving part and the light guide section are arranged at an angle relative to each other, and a deflecting portion is provided at a transition part between the light receiving part and the light guide section and configured to reflect light emitted from a corresponding light source and entering through a corresponding light receiving part towards the light guide section. Preferably, the deflecting portion includes a total reflection surface, which can achieve a better mixing effect of light and a more uniform lighting effect.

In an embodiment, the light receiving part and the light guide section are perpendicular to each other.

In an embodiment, the first light receiving part and the second light receiving part have different lengths.

In an embodiment, the first light receiving part and the second light receiving part are arranged alternately at the light guide section.

In an embodiment, the first light receiving part and the second light receiving part each include a collimator configured to collimate received light into parallel light.

In an embodiment, the first light source and the second light source include LEDs. Preferably, one of the first light source and the second light source is capable of emitting lights having two different brightnesses. For example, the first light source is a white light LED capable of emitting lights having two different intensities, so that a lighting assemble having the first light source may be used as a position lamp when a light emitting intensity of the first light source is relatively weak, and may used as a daytime running light when the light emitting intensity of the first light source is relatively strong.

In an embodiment, the mounting sub-plates include PCB boards.

An embodiment of the present disclosure further provides a lighting apparatus, comprising the light source assembly described in any of embodiments of the present disclosure.

An embodiment of the present disclosure further provides a vehicle, comprising the lighting apparatus described in any of embodiments of the present disclosure.

Other objects and advantages of the present disclosure will become apparent from the following description of the present disclosure taken in conjunction with the accompanying drawings, and may give a comprehensive understanding of the present disclosure.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF PREFERRED EMBODIMENTS

Figure 1:
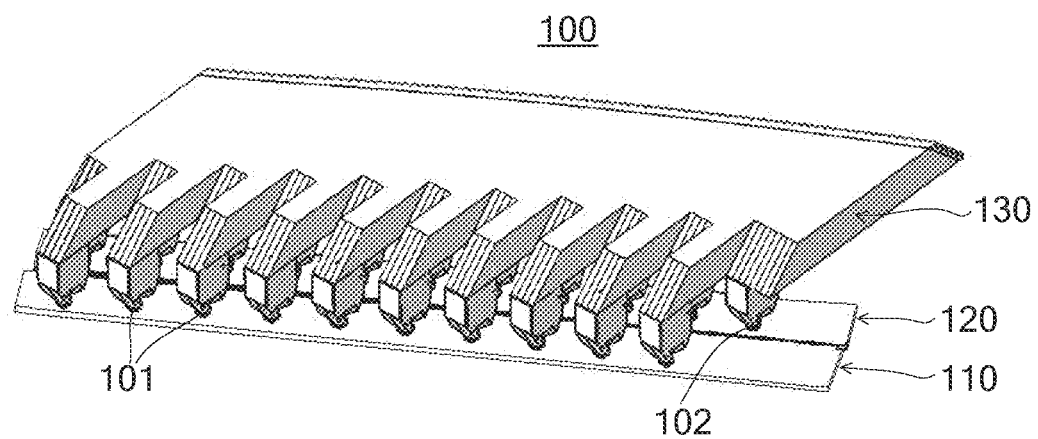
FIG. 1 is a perspective view schematically showing an arrangement of a light emitting assembly according to an embodiment of the present disclosure.

Exemplary embodiments of the present disclosure will be described hereinafter in detail with reference to the attached drawings. Throughout the description, like reference numerals refer to like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present disclosure, there is provided a light emitting assembly for a lighting apparatus or a motor vehicle, the light emitting assembly comprising: a mounting plate comprising mounting sub-plates; a light source assembly mounted on the mounting plate, the light source assembly comprising a first light source configured for emitting light with a first color and a second light source configured for emitting light with a second color; and a light guide member having a light entrance section and a light guide section integrally formed, the light guide member being configured to couple the light emitted from the light source assembly into the light guide member; the first light source and the second light source of the light source assembly are mounted on different ones of the mounting sub-plates of the mounting plate respectively. Thereby, various lighting/signaling functions may be achieved by arranging different types light sources (for example, emitting light having different colors) on different mounting sub-plates.

The following description of various embodiments of the present disclosure made with reference to the drawings is intended to set forth the general concept of the present disclosure, and should not be explained as being limitative to the present disclosure.

Figure 2:
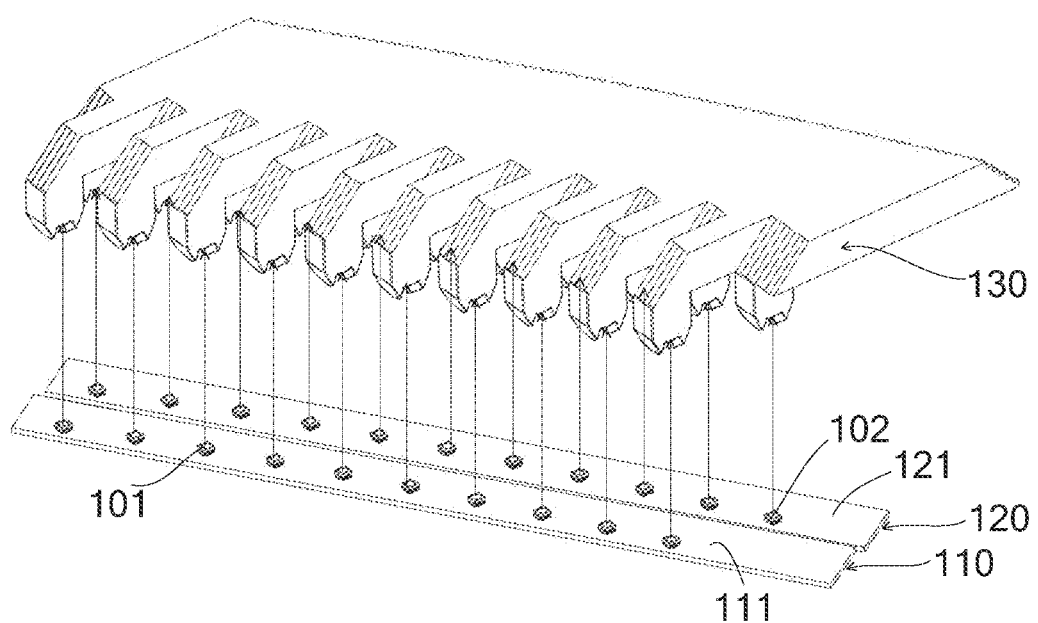
FIG. 2 is an exploded view schematically showing an arrangement of a light emitting assembly according to an embodiment of the present disclosure.
Figure 3:
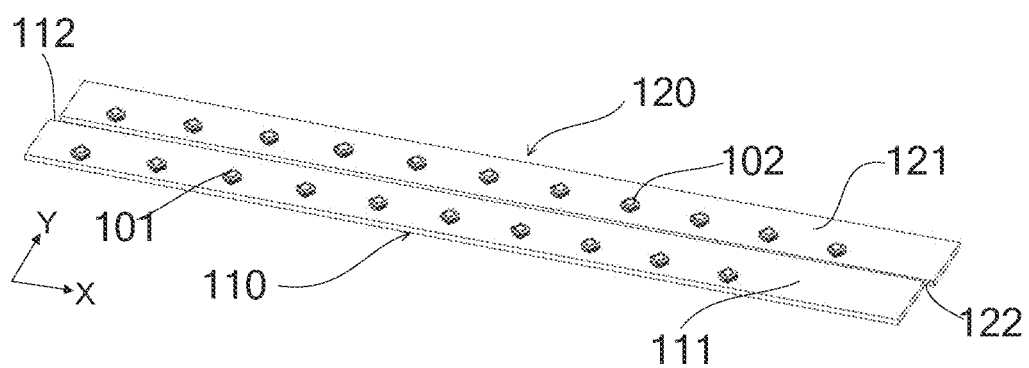
FIG. 3 is a perspective view schematically showing an arrangement of light sources and mounting sub-plates according to an embodiment of the present disclosure.

FIGS. 1-3 schematically show an arrangement of a light source assembly according to an exemplary embodiment of the present disclosure. As shown in the figures, a light emitting assembly 100 comprises at least two mounting sub-plates, for example, a first mounting sub-plate 110 and a second mounting sub-plate 120, a plurality of first light sources 101 mounted on the first mounting sub-plate 110, and a plurality of second light sources 102 mounted on the second mounting sub-plate 120. Here, although two mounting sub-plates are taken as an example for describing the light source assembly of the present disclosure, it should be noted the number of the mounting sub-plates is not limited to two, and rather, may be set as required. In some examples, the mounting sub-plate may include a circuit board, such as a printed circuit board (PCB), thereby the mounting plate may be manufactured at a lower cost.

In the embodiments shown in FIGS. 2 and 3, the first mounting sub-plate 110 has a first mounting surface 111 and a first side face 112, the second mounting sub-plate 120 has a second mounting surface 121 and a second side face 122, a plurality of first light sources 101 are arranged on the first mounting surface 111, a plurality of second light sources 102 are arranged on the second mounting surface 121, and the first mounting sub-plate 110 and the second mounting sub-plate 120 are arranged side by side in such a way that their side faces 112, 122 face towards each other and are close to each other, so that the first mounting surface 111 and the second mounting surface 121 face toward a same direction, thereby the light sources 101, 102 mounted on the first mounting surface 111 and the second mounting surface 121 may emit light beams in a same direction. For example, the first mounting surface 111 and the second mounting surface 121 are positioned such that they do not cross or overlap with each other, exemplarily, the first mounting surface 111 and the second mounting surface 121 may be positioned such that they are substantially coplanar. Side faces 112, 122 of the first mounting sub-plate 110 and the second mounting sub-plate 120 may be parallel to each other, and face toward each other without crossing therebetween. In some embodiments, the side faces 112, 122 do not have portions projecting towards each other, for example, the side faces 112, 122 are substantially flat or are planar faces.

It is noted that in the disclosure, the mounting surface of the mounting sub-plate is a surface perpendicular to a thickness direction of the mounting sub-plate, while the side face is a side face parallel to the thickness direction of the mounting sub-plate; for a rectangular mounting sub-plate, the mounting sub-plates are preferably arranged side by side such that their long side faces face towards each other and are close to each other; in addition, if the mounting sub-plates are arranged side by side in a side face-to-side face way, existing circuit boards or PCBs may be directly used as the mounting sub-plates, without modifying shapes of the circuit boards or PCBs; for example, it is not necessary for the periphery or side face of the circuit board or PCB to be formed with any structure such as a recess or protrusion for arranging the light source.

According to an embodiment of the present disclosure, these mounting sub-plates are arranged side by side, such that the plurality of first light sources 101 are positioned adjacent to one another, and the plurality of second light sources 102 are positioned adjacent to one another, as shown in FIGS. 2 and 3. It is noted that in the disclosure, expression "the plurality of first light sources 101 are positioned adjacent to one another, and the plurality of second light sources 102 are positioned adjacent to one another" means that in case that the mounting sub-plates are arranged side by side, there are no second light sources 102 or other light sources between adjacent first light sources 101 mounted on the corresponding mounting sub-plate, and there are no first light sources 101 or other light sources between adjacent second light sources 102 mounted on the corresponding mounting sub-plate. Adjacent first light sources mounted on the first mounting sub-plate are spaced apart by a distance, and adjacent second light sources mounted on the second mounting sub-plate are spaced apart by a distance; for example, the distance between adjacent first light sources is 8 mm, and/or the distance between adjacent second light sources is 8 mm.

In an embodiment, in case that the mounting sub-plates are arranged side by side, the plurality of first light sources 101 are arranged on the first mounting sub-plate 110 along a first line (e.g., a straight or curved line), and the plurality of second light sources 102 are arranged on the second mounting sub-plate 120 along a second line (e.g., a straight or curved line) different from the first line. Exemplarily, the first line and the second line are not collinear, for example, the first line is substantially parallel to the second line. As shown in FIG. 3, the line along which the first light sources 101 are arranged may extend in an X direction, the line along which the second light sources 102 are arranged may also extend in the X direction, but they are not collinear.

In other embodiments, in case that the mounting sub-plates are arranged side by side, the plurality of first light sources 101 may be arranged linearly along two or more straight lines so as to form a first array, the plurality of first light sources 102 may also be arranged linearly along two or more straight lines so as to form a second array. Exemplarily, there are not any second light sources or other light sources different from the first light source in the first array, and there are not any first light sources or other light sources different from the second light source in the second array. For example, mounting positions of the first light sources and the second light sources on corresponding mounting sub-plates do not alternate or cross with each other, or the line along which the first light sources are arranged is not collinear with the line along which the second light sources are arranged.

According to some exemplary embodiments of the present disclosure, orthographic projections of the plurality of first light sources 101 onto a plane parallel to one of the first line and the second line and parallel to the thickness direction of the first mounting sub-plate 110 or the second mounting sub-plate 120 and orthographic projections of the plurality of second light sources 102 onto the plane alternate one another. Exemplarily, the first light sources 101 and the second light sources 102 are arranged on the corresponding mounting sub-plates such that orthographic projections of the plurality of first light sources 101 onto a plane where the side face 112 or 122 is located and orthographic projections of the plurality of second light sources 102 onto the plane alternate one another. For example, the orthographic projection of one first light source 101 onto the plane is located between the orthographic projections of two adjacent second light sources 102 onto the plane, or the orthographic projection of one second light source 102 onto the plane is located between the orthographic projections of two adjacent first light sources 101 onto the plane. Of course, when required in practice, orthographic projections of two or more second light sources onto the plane may be located between the orthographic projections of two adjacent first light sources onto the plane, or orthographic projections of two or more first light sources onto the plane may be located between the orthographic projections of two adjacent second light sources onto the plane. In an example, the orthographic projections of the plurality of first light sources 101 onto the plane and the orthographic projection of the plurality of second light sources 102 onto the plane are arranged substantially along one line (e.g., a straight line), which may effectively reduce scraps generated during production of PCB board.

In an exemplary embodiment, a color of light emitted by the first light source 101 and a color of light emitted by the second light source 102 may be different from each other, thereby by arranging different types of light sources (for example, having different light emitting colors) on different mounting sub-plates, a plurality of lighting/signaling functions may be achieved. For example, if the first light source emits yellow light while the second light source may emit white light with two different intensities, a signaling function for a direction indicator lamp (yellow light) and lighting functions for a headlight (daytime running light) and a position light (while light) may be achieved by the light emitting assembly of the present disclosure, where the second light source is turned off when the first light source emits light, vice versa. Of course, more mounting sub-plates may be provided so that more light sources may be provided, thereby providing more functions; optionally, different light emitting/lighting/signaling devices may be obtained by matching or combining light with different colors, for example, a red light source may be provided. Herein, white light may be used for a position light, a low beam headlamp, a high beam headlamp, a fog light, a daytime running light or the like, yellow light may be used for a direction indicator lamp, a warning light or the like, and red light may be used for a stop light, a tail light or the like. Thus, the light sources with the above-described colors may be combined in various ways so as to form light emitting/lighting/signaling devices having different functions. In other embodiments, as required in practice, at least one of the first light source and the second light source may emit light with two or more colors, or more mounting sub-plates may be provided for mounting different types of light sources thereon. In an embodiment of the present disclosure, a LED lamp may be preferably used as the light source, for example, a white LED lamp, a yellow LED lamp or a red LED lamp.

As shown in FIGS. 1, 2, 4 and 5, the light source assembly 100 further comprises a light guide member 130, and the light guide member 130 has a light entrance section and a light guide section integrally formed. The light guide member 130 receives light from the first light sources 101 and the second light sources 102 at different positions of the light entrance section, and guides the light to exit from a light exiting surface 134 of the light guide section. In FIGS. 1, 2, 4 and 5, the light exiting surface 134 is a stepped surface as shown, but the present disclosure is not limited to this, a light exiting surface having other shape or configuration may be provided according to a path or distribution of light in the light guide, a light exiting effect (e.g., a point light source effect, a line light source effect, etc.), or the like.

In the illustrated embodiment, the light entrance section of the light guide member 130 is provided with a plurality of first light receiving parts 131 and a plurality of second light receiving part 132s, and the first light receiving parts 131 and the second light receiving parts 132 are respectively assigned to the first light sources 101 and the second light sources 102 mounted on the corresponding mounting sub-plate 110, 120; for example, each first light receiving part 131 receives light emitted from one first light source 101, and each second light receiving part 132 receives light emitted from one second light source 102. Therefore, an orientation of the light receiving part is consistent with an orientation of a corresponding light source. For example, when the light sources are arranged along a straight line on the mounting sub-plate, corresponding light receiving parts are also arranged in a straight line; when the light sources are arranged along a curved line on the mounting sub-plate, corresponding light receiving parts are also arranged in a curved line. It is noted that although the light receiving parts shown in the figures have a same length, they may also have different lengths, as long as light emitted from the light source can be guided into corresponding light receiving parts, thereby the mounting plates for the light sources may be arranged in a more flexible way. Of course, respective separate ones of the first light sources 101 and the second light sources 102 may be disposed at different heights.

In other embodiments, the light guide member 130 may only have one light receiving part or one light entrance surface, light emitted from the first light sources 101 and the second light source 102 may enter the light guide member 130 at different positions of such one light receiving part or one light entrance surface.

Figure 5:
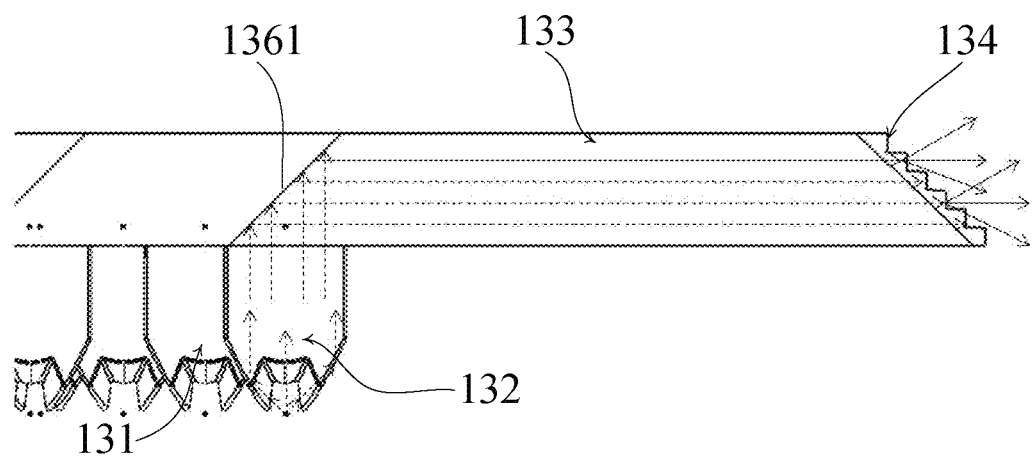
FIG. 5 is a schematic diagram showing a light path in a light guide member according to an embodiment of the present disclosure.

In an example, the light receiving part may be configured as a collimator to collimate received light into parallel light, as shown in FIG. 5. Here, a body of the light receiving part is in a columnar shape and has a tapered end facing the light source. Alternatively, a light collimator may be provided between the light source and a light entrance side or light entrance surface of the light guide member.

Figure 4:
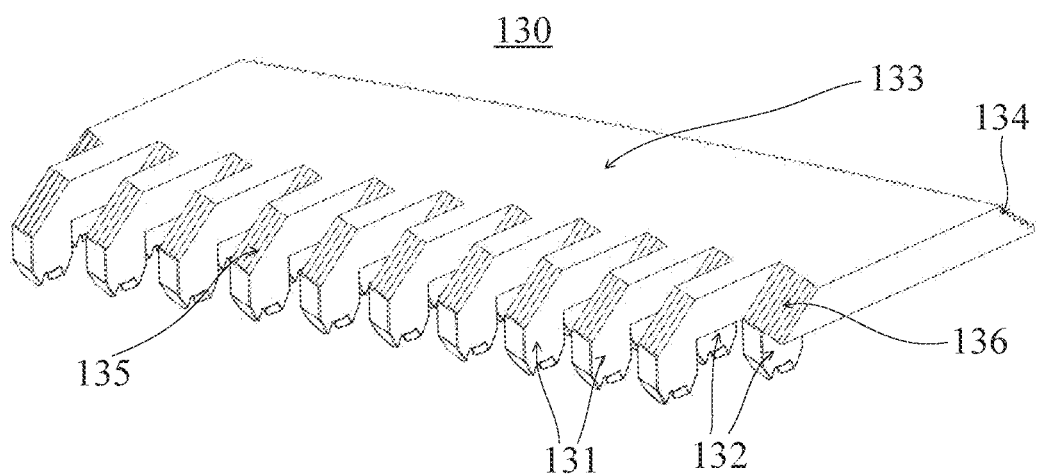
FIG. 4 is a perspective view schematically showing a configuration of a light guide member according to an embodiment of the present disclosure.

In an example, a distance by which the first light receiving part 131 projects from light guide section 133 is larger than a distance by which an adjacent second light receiving part 132 projects from the light guide section 133, as shown in FIGS. 1, 2 and 4, thereby the first light receiving part 131 and the second light receiving part 132 correspond in position to the first light source 101 and the second light source 102 mounted on the circuit boards 110, 120 arranged side by side; for example, a projection of the first light receiving part 131 on the first mounting sub-plate 110 in a light incidence direction overlaps in position with a corresponding first light source 101, and a projection of the second light receiving part 132 on the second mounting sub-plate 120 in a light incidence direction overlaps in position with a corresponding second light source 102. Exemplarily, the light guide section 133 and/or the light receiving parts 131, 132 is/are in a flat shape, but the present disclosure is not limited to this, the light guide member or the light receiving part and the light guide section thereof may have other shape(s), for example, may be an elongate light guide, a rod-shaped light guide or the like.

As shown in FIGS. 1, 2, 4 and 5, the first light receiving part 131 and/or the second light receiving part 132 and the light guide section 133 form a substantially L-shaped profile. The light guide member 130 may further comprise deflecting portions 135, 136 located between the light guide section 133 and corresponding light receiving parts 131, 132 and configured to reflect light from the corresponding light receiving parts so as to deflect the light or convert direction of the light so that the light enters the light guide section 133. As shown in FIG. 5, inside the light guide member 130, the deflecting portion has a total reflection surface (e.g., a total reflection surface 1361) configured to receive light from the first light receiving part and/or the second light receiving part and guide the light into the light guide section 130 in a total reflection way, such that the light propagates within the light guide section 133 and exits from the light exiting surface 134. Such total reflection surface may also cause light from the first light source or the second light source to mixed in the light guide member so as to provide a more uniform lighting effect and thereby achieving various functions including a lighting/signaling function.

In addition, although in the illustrated embodiments of the present disclosure, the different mounting sub-plates with different light source mounted thereon are arranged side by side on a same side of the light guide member, the different mounting sub-plates with different light source mounted thereon may be arranged on different sides (e.g., opposite sides) of the light guide in other embodiments, for example, the structure of the light guide is designed such that light from different light sources may exit from a same light exiting surface.

An embodiment of the present disclosure further provides a lighting apparatus comprising the light source assembly described in any of above embodiments. The light source assembly/lighting apparatus described in the embodiments of the present disclosure may be applied into for example any lighting and/or signaling device. The lighting and/or signaling device may include various types of lighting lamps and/or signaling lamps of a motor vehicle, for example, a head lamp, a center high mounted stop lamp, a direction indicator lamp, a position lamp, a tail stop light, etc.

An embodiment of the present disclosure further provides a motor vehicle comprising the light source assembly or the lighting apparatus described in any one of the above-described embodiments.

Thereby, according to the embodiments of the present disclosure, by arranging different types light sources (for example, emitting light having different colors) on different mounting sub-plates, many lighting/signaling functions may be achieved. For example, light sources mounted on different mounting sub-plates and emitting lights having different colors are arranged alternately along two lines, and light is mixed by means of a corresponding total reflection surface, a more uniform light effect is obtained and two or three lighting/signaling functions can be achieved; a uniform distribution of the light in the light guide member is obtained through total reflection, and light with different colors exit from a same light exiting surface of the light guide member, thereby it is not necessary to hollow out the interior of the light guide member for redistribution of the light, reducing difficulty in mould design and in injection molding; different types (e.g., having different light emitting colors) of light sources (e.g., the first light source and the second light source) are arranged on different mounting sub-plates and are not collinear, thus it will be favorable for circuit design and heat dissipation, so that light sources of a same type (e.g., light sources emitting light with a same color) may be arranged more densely on the corresponding mounting sub-plate, and a more uniform light exiting effect may be obtained. Since different types of light sources are distributed on different mounting sub-plates, a heat conduction area for the light sources is increased, and a gap may be provided between the mounting sub-plates so as to obtain a better heat dissipation performance, and no separate radiators may be provided in practice, thereby reducing the number of parts and mounting steps. Since no radiators are required to be installed, and the light sources are distributed on two or more mounting sub-plates respectively, each mounting sub-plate may have a smaller size even though a relatively greater number of light sources are arranged, thereby the entire volume of the lighting apparatus is reduced, and a mounting space of the vehicle reserved for the light emitting device is saved. Further, since the radiator is omitted, the light sources and the circuit boards may be fixed directly on a housing of the lighting apparatus, rather than being fixed by means of the radiator, thus an assembly tolerance is smaller.

Although the present disclosure has been described with reference to the accompanying drawings, the embodiments disclosed in the attached drawings are intended to illustrate the exemplified embodiment of the disclosure and should not be construed as being limitative to the disclosure. Sizes and proportions in the figures are only illustrative and should not be construed as being limitative to the disclosure.

Although some embodiments of the general concept of the disclosure have been described and illustrated with reference to the accompanying drawings, it would be appreciated by those ordinary skilled in the art various changes or modifications may be made to these embodiments without departing from principle and spirit of the disclosure. The scope of the present invention is solely defined by claims and their equivalents.

What is claimed is:

1. A light emitting assembly for a lighting apparatus of a motor vehicle, comprising:
    a mounting plate comprising mounting sub-plates;
    a light source assembly mounted on the mounting plate, the light source assembly comprising first light sources distributed across a first mounting sub-plate of the mounting sub-plates and configured for emitting light of a first color and second light sources distributed across a second mounting sub-plate of the mounting sub-plates and configured for emitting light of a second color; and
    a light guide member comprising:
        a light guide section terminated at one side by a light exiting surface spanning a width and thickness of the light guide section and at an opposing side by light entrance surfaces distributed across the width of the light guide section and respectively spanning the thickness thereof; and
        a light entrance section comprising a plurality of first light receiving parts optically coupled to the respective first light sources and a plurality of second light receiving parts optically coupled to the respective second light sources, the first light receiving parts and the second light receiving parts being integrally formed with the light guide section and optically coupled thereto through the respective light entrance surfaces, wherein the first light receiving parts and the second light receiving parts are arranged in alternating sequence across the width of the light guide section.

2. The light emitting assembly according to claim 1, wherein each of the first light receiving parts and the second light receiving parts are arranged at an angle relative to the light guide section, and a deflecting portion is provided at a transition part between each of the first and second light receiving parts and the light guide section that are configured to reflect light emitted from a corresponding one of the first and second light sources through a corresponding one of the light entrance surfaces and into the light guide section.

3. The light emitting assembly according to claim 2, wherein the deflecting portion includes a total reflection surface.

4. The light emitting assembly according to claim 2, wherein each of the first and second light receiving parts are perpendicular to the light guide section.

5. The light emitting assembly according to claim 1, wherein the first light receiving parts are optically coupled to the corresponding light entrance surfaces through light guide segments such that the first light receiving parts are a greater distance away from the light guide section than the second light receiving parts.

6. The light emitting assembly according to claim 1, wherein the first light receiving parts and the second light receiving parts are alternatingly coupled to the light guide section through the respective light entrance surfaces.

7. The light emitting assembly according to claim 1, wherein the first light receiving parts and the second light receiving parts each include a collimator configured to collimate received light into parallel light.

8. The light emitting assembly according to claim 1, wherein the first light sources and the second light sources include light emitting diodes.

9. The light emitting assembly according to claim 1, wherein the first light sources or the second light sources are configured to selectively emit light at two different intensities.

10. The light emitting assembly according to claim 1, wherein the mounting sub-plates include printed circuit boards.

11. A lighting apparatus, comprising the light emitting assembly of claim 1.

12. A vehicle, comprising the lighting apparatus of claim 11.

* * * * *